Jan. 25, 1949. W. E. WELCH 2,460,051
THERMOMETER HAVING A CASING WITH A MAGNIFYING ELEMENT
Filed Aug. 2, 1944
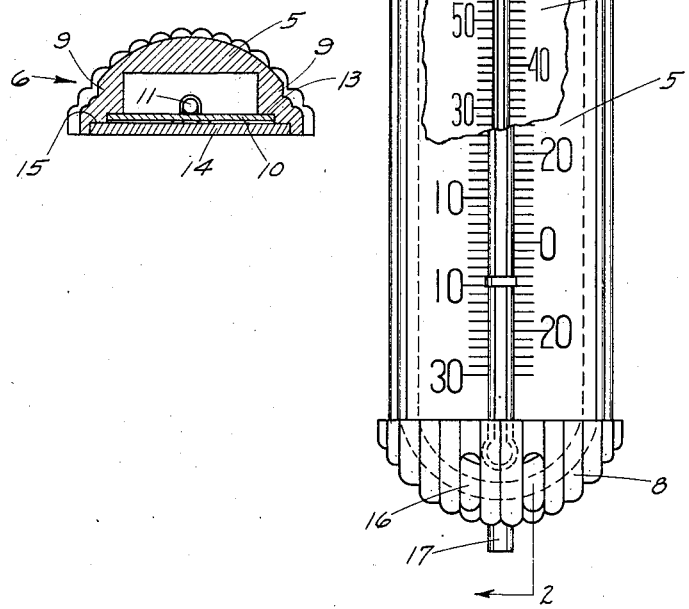
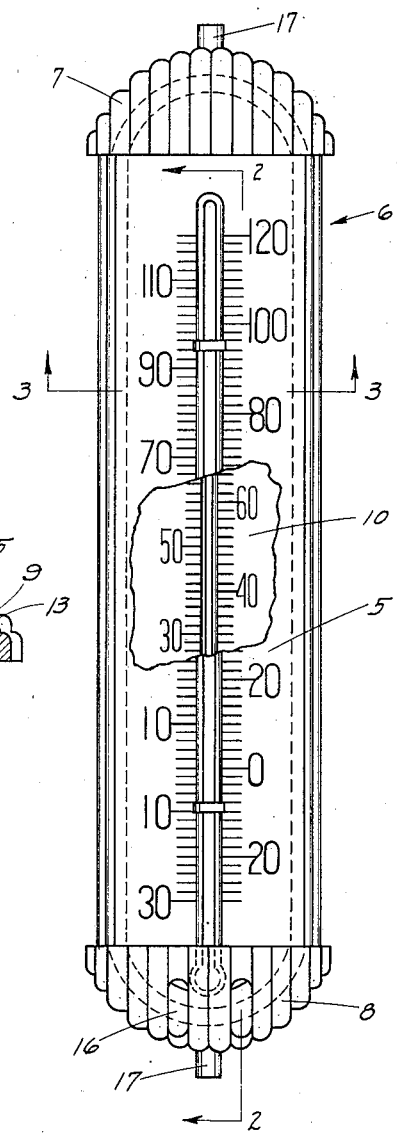
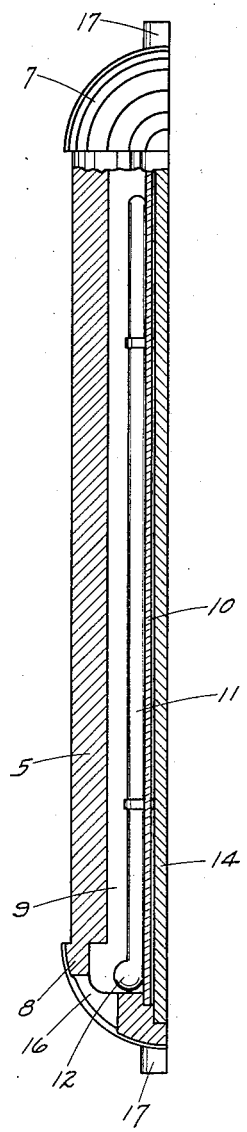
INVENTOR
WILLIAM E. WELCH
BY
ATTORNEY Patented Jan. 25, 1949

2,460,051

UNITED STATES PATENT OFFICE 2,460,051

THERMOMETER HAVING A CASING WITH A MAGNIFYING ELEMENT

William E. Welch, Springfield, Ohio, assignor to The Chaney Manufacturing Company, Springfield, Ohio, a corporation of Ohio Application August 2, 1944, Serial No. 547,769

3 Claims. (Cl. 73—372)

1

This invention relates to a magnifying device and is designed primarily for use with a thermometer but is not limited to such use.

One object of the invention is to provide a magnifying device which can be applied at relatively low cost to a thermometer or other indicating device to enable the small size indications of the latter to be easily read at substantial distances therefrom.

A further object of the invention is to provide a magnifying device of molded material the surfaces of which do not require grinding or a similar finishing operation to enable it to function as a magnifying element.

A further object of the invention is to provide a magnifying device which is of relatively light weight and is less subject to breakage than is glass.

A further object of the invention is to provide an indicating device with a casing one wall of which is formed of a molded transparent plastic shaped to form a magnifying element.

A further object of the invention is to provide an indicating device, of the type having an elongate series of graduations, with a magnifying device extending for the full length of said series of graduations and shaped to uniformly magnify all parts of said graduations and the associated indications, without distortion, and which can be produced at a low cost.

A further object of the invention is to provide a tightly closed casing for a thermometer the main portion of which is formed of plastic material and one wall of which constitutes a magnifying element.

Other objects of the invention may appear as the device is described in detail.

In the accompanying drawings Fig. 1 is a front elevation, partly broken away, of a magnifying device embodying the invention, showing the same applied to an ordinary thermometer; Fig. 2 is a longitudinal section taken on the line 2—2 of Fig. 1, and partly in elevation; and Fig. 3 is a transverse section taken on the line 3—3 of Fig. 1.

In these drawings I have illustrated one embodiment of my invention and have shown the same as applied to a thermometer of a well known type. In this form the magnifying element is elongate in shape, with a convex outer surface, and comprises a part of a casing in which the temperature indicating elements are supported, but it is to be understood that the magnifying element may be of any suitable shape and may be supported in any suitable manner in operative relation to an indicating device or other device having marks, letters or figures which it is desired to magnify.

The magnifying element, and in the present instance the main portion of the casing, is formed, preferably by molding, of a transparent plastic material of such a character that the molded surfaces thereof will be clear and smooth. Thus the molded magnifying element is complete and ready for its intended use without grinding or other treatment to impart thereto the necessary transparency and contour, such as is required in the manufacture of a glass magnifying element and which renders the glass magnifying device so expensive as to practically prohibit its use in an ordinary thermometer or other low priced device. Further, such plastic material is much lighter in weight than glass and less fragile than glass and is therefore better adapted for use on thermometers and the like. Any plastic material having the necessary transparency and the molded surfaces of which are clear and smooth can be used, and the plastic known commercially as "Lucite" is well suited for the purpose.

The magnifying element 5 comprises a body of plastic material of a form suited to the device to which it is to be applied and in the illustrated embodiment it is of the elongate and relatively narrow form best adapted for use with an ordinary thermometer, and has its inner surface flat and its outer surface curved about a longitudinal axis, the curvature of said outer surface being such as to impart the desired magnifying property to the element. It may be supported in operative relation to the temperature indicating elements, or other parts to be magnified, in any suitable manner, and it is here shown as supported by and forming a part of a casing 6 which encloses the indicating elements. Preferably the magnifying element forms the front wall of the casing and has its end portions curved, or otherwise deflected, rearwardly, as shown at 7 and 8. Side walls 9 extend rearwardly from the lateral edge portions of the magnifying element and are joined at their ends with the rearwardly deflected end portions of the latter. The card 10, which bears the graduations and carries the tube 11 and its bulb 12, is supported in the cavity formed between the walls of the casing, which are provided with shoulders 13 to properly position the card. The rear side of the cavity is closed by a suitable closure and preferably the closure is sufficiently tight to be weather proof. In the arrangement shown a closure plate 14, of any suitable material, fits snugly in the rear portion of the cavity, the walls of which are provided with shoulders 15 to support the closure and to which it may be secured, if desired.

Preferably the side and end walls of the casing are formed of plastic material and are molded in one piece with the front wall or magnifying element. The back wall or closure 14 is a separate part which is attached to the side and end walls after the indication bearing card and tube have been inserted in the casing, and serves to retain the card and the tube supported thereon in their proper positions in the casing. In this manner the major portions of the device, including the magnifying element, are completely formed by a single operation and inasmuch as the surfaces of the plastic material come from the mold in a clear smooth condition the device is immediately ready for assembly with the indicating device, subject only to such cleaning of the surfaces as may be necessary.

The lower end portion of the magnifying device, which is in front of the bulb 12, is of a light diffusing character to avoid the concentration of light rays on the bulb, which might unduly affect the temperature in the bulb. For this purpose the outer surface of the lower end portion is fluted or otherwise formed in a manner which will diffuse the light and will at the same time be ornamental, and the upper end surface of the element may be similarly formed for ornamental purposes. One of the rearwardly deflected end walls is provided with an opening 16 to permit circulation of air within the casing and this opening is preferably in the lower end wall to prevent rain or foreign matter from entering the casing when the thermometer is located out of doors. The ends of the casing may also be provided with pintles 17 to enable the casing to be pivotally mounted in a suitable bracket.

The magnifying element herein described has excellent magnifying qualities, it is of light weight, has ample strength and can be produced at a low cost, and can therefore be applied to an ordinary thermometer, or other relatively low priced device, without an objectionable increase in the price thereof. By forming the magnifying element integral with the supporting structure or casing for the tube and the indication bearing card and so shaping the casing that the card will fit snugly therein the entire structure, with the exception of the back wall, may be formed by a single operation and complete assembly may be quickly and easily effected by merely inserting the casing with its attached tube in the casing and then attaching the back wall which retains the card in its proper position in the casing. The magnifying element being co-extensive with the card uniformly magnifies all indications on the card as well as the column of liquid in the tube, without distortion.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent is:

1. In a thermometer, a casing comprising an elongate relatively narrow body of transparent solidified plastic material having in its rear side a cavity extending for the major portion of the length thereof, a card supported in said cavity and bearing a longitudinal series of temperature indications, a thermometer tube and bulb supported in fixed relation to said indications, said body having a front portion shaped to form a magnifying element of a length approximately equal to the length of said series of indications, and also having a light diffusing wall in front of and extending above said bulb.

2. A magnifying device for a thermometer of the type comprising a tube, a bulb carried by said tube and a card fixed with relation to said tube and bearing a series of temperature indications, said device comprising an elongate and relatively narrow body of transparent solidified plastic material adapted to be arranged in front of the tube, bulb and indication bearing card of said thermometer, that portion of said body which is to be positioned in front of the indications on said card having smooth clear surfaces shaped to magnify said indications, and that portion of said body which is to be positioned in front of said bulb having a light diffusing surface.

3. In a thermometer, a casing comprising an elongate and relatively narrow body of transparent solidified plastic material having in its rear side a relatively wide cavity extending for the major portion of the length thereof and having substantially parallel side walls, the walls of said cavity having adjacent the rear edges thereof inner and outer shoulders, a card supported by said inner shoulders in a predetermined position in said cavity and bearing a longitudinal series of temperature indications, a thermometer tube supported in fixed relation to said indications, and a closure for the rear portion of said cavity supported by said outer shoulders, said body having a front portion shaped to form a magnifying element of the length and width approximating respectively the length and width of said series of indications.

WILLIAM E. WELCH.

REFERENCES CITED

The following references are of record in the file of this patent:

UNITED STATES PATENTS

| Number | Name | Date |
| --- | --- | --- |
| 307,775 | Kirk et al. | Nov. 11, 1884 |
| 1,367,879 | Laird | Feb. 18, 1921 |
| 1,387,267 | Holle | Aug. 9, 1921 |
| 1,535,377 | Radu | Apr. 28, 1925 |
| 1,590,613 | Benedict | June 29, 1926 |
| 1,754,455 | Boyce | Apr. 15, 1930 |
| 1,811,184 | Norwood | June 23, 1941 |
| 1,848,587 | Timson | Mar. 8, 1932 |
| 1,971,285 | Turner et al. | Aug. 21, 1934 |
| 2,056,693 | Stanley | Oct. 6, 1936 |
| 2,057,807 | Whitmore | Oct. 20, 1936 |
| 2,082,750 | Herold | June 1, 1937 |
| 2,086,286 | Stanley | July 6, 1937 |
| 2,151,573 | Stanley | Mar. 21, 1939 |
| 2,293,597 | Dietz | Aug. 18, 1942 |
| 2,312,873 | Bruns | Mar. 2, 1943 |
| 2,313,688 | Wappner et al. | Mar. 9, 1943 |
| 2,340,421 | Obrist | Feb. 1, 1944 |
| 2,349,604 | Barrows | May 23, 1944 |